(12) United States Patent
Tådne et al.

(10) Patent No.: US 10,752,068 B2
(45) Date of Patent: Aug. 25, 2020

(54) SUSPENSION ARRANGEMENT (71) Applicant: VOLVO CONSTRUCTION EQUIPMENT AB, Eskilstuna (SE)

(72) Inventors: Lukas Tådne, Linköping (SE); Erik Stugholm, Linköping (SE); Jörgen Ahlberg, Växjö (SE)

(73) Assignee: Volvo Construction Equipment AB, Eskilstuna (SE)

( * ) Notice: Subject to any disclaimer, the term of this patent is extended or adjusted under 35 U.S.C. 154(b) by 245 days.

(21) Appl. No.: 15/735,035

(22) PCT Filed: Jun. 15, 2015

(86) PCT No.: PCT/SE2015/050691
§ 371 (c)(1),
(2) Date: Dec. 8, 2017

(87) PCT Pub. No.: WO2016/204659
PCT Pub. Date: Dec. 22, 2016

(65) Prior Publication Data
US 2019/0329617 A1    Oct. 31, 2019

(51) Int. Cl.
*B60G 5/02* (2006.01)
*B60G 11/22* (2006.01)

(52) U.S. Cl.
CPC ............. *B60G 5/02* (2013.01); *B60G 11/22* (2013.01); *B60G 2202/14* (2013.01); *B60G 2300/09* (2013.01)

(58) Field of Classification Search
CPC ............. B61F 5/325; B61F 5/30; B60G 5/02
See application file for complete search history.

(56) References Cited

U.S. PATENT DOCUMENTS

| | | | |
|---|---|---|---|
| 2,360,619 A | 10/1944 | Peterman | |
| 2,754,132 A | 7/1956 | Martin | |
| 3,517,620 A * | 6/1970 | Weber | B61F 5/308 105/167 |
| 3,520,548 A * | 7/1970 | McGee | B60G 5/02 280/678 |
| 3,539,170 A * | 11/1970 | Hamel | B61F 5/08 267/294 |

(Continued)

FOREIGN PATENT DOCUMENTS

| | | | | |
|---|---|---|---|---|
| CA | 2561056 A1 * | 10/2005 | ............. | B61F 5/305 |
| DE | 2548238 A1 * | 5/1976 | ............. | B60G 5/01 |

(Continued)

OTHER PUBLICATIONS

International Search Report (dated Feb. 9, 2016) for corresponding International App. PCT/SE2015/050691.

(Continued)

*Primary Examiner* — Nicole T Verley
(74) *Attorney, Agent, or Firm* — Sage Patent Group (57) ABSTRACT

A suspension arrangement for a bogie beam for a vehicle includes a connector having an arrangement for pivotally connecting the connector to a vehicle main body for pivoting around a substantially horizontal bogie pivot axis. The suspension arrangement includes a resilient arrangement for connecting the connector and the bogie beam to each other.

20 Claims, 5 Drawing Sheets

(56) References Cited

U.S. PATENT DOCUMENTS

| | | | | |
|---|---|---|---|---|
| 3,946,676 A | * | 3/1976 | Mackaness | B60G 5/04 105/169 |
| 4,064,956 A | * | 12/1977 | Wildey | B60G 5/02 180/24.05 |
| 4,067,262 A | * | 1/1978 | Scheffel | B61F 3/02 105/168 |
| 4,173,933 A | * | 11/1979 | Kayserling | B61F 5/148 105/182.1 |
| 4,193,612 A | | 3/1980 | Masser | |
| 4,324,417 A | | 4/1982 | Johansson | |
| 4,429,898 A | * | 2/1984 | Bedenbender | B60G 5/02 180/9.54 |
| 4,512,261 A | * | 4/1985 | Horger | B61F 5/38 105/165 |
| 4,676,172 A | * | 6/1987 | Bullock | B61D 9/14 105/168 |
| 5,447,324 A | * | 9/1995 | Raidel, Sr. | B60G 5/04 280/676 |
| 6,035,788 A | * | 3/2000 | Mau | B61F 5/325 105/218.1 |
| 6,585,286 B2 | * | 7/2003 | Adema | B60G 5/02 280/124.178 |
| 6,921,097 B2 | * | 7/2005 | Ohlsson | B60G 5/06 280/124.109 |
| 6,951,260 B1 | * | 10/2005 | Isley | B60G 5/02 180/9.54 |
| 9,004,512 B2 | * | 4/2015 | Noble | B60G 11/24 280/124.116 |
| 10,059,351 B2 | * | 8/2018 | Kamura | F16F 1/403 |
| 2010/0044992 A1 | | 2/2010 | Noble et al. | |
| 2010/0162919 A1 | * | 7/2010 | Aitken | B61F 5/301 105/198.2 |
| 2017/0158011 A1 | * | 6/2017 | Rarey | B60G 5/02 |
| 2017/0203623 A1 | * | 7/2017 | Pettersson | B60G 5/02 |

FOREIGN PATENT DOCUMENTS

| | | | | |
|---|---|---|---|---|
| EP | 0021819 A1 | | 1/1981 | |
| EP | 3013665 B1 | * | 9/2017 | |
| EP | 1737716 B1 | * | 11/2017 | |
| FR | 2336265 A1 | * | 7/1977 | B60B 27/02 |
| FR | 2349466 A1 | | 11/1977 | |
| FR | 2676416 A1 | * | 11/1992 | B60F 5/08 |
| GB | 2046680 A | * | 11/1980 | B60G 5/02 |
| GB | 2088298 A | * | 6/1982 | B60G 5/02 |
| WO | 2009148588 A1 | | 12/2009 | |

OTHER PUBLICATIONS

Railway Technical Web Pages (Aug. 31, 2014) http://www.railway-technical.com/suspen.shtml.

\* cited by examiner

SUSPENSION ARRANGEMENT

BACKGROUND AND SUMMARY

The present disclosure relates to a suspension arrangement. Moreover, the present disclosure relates to a bogie beam assembly and/or a vehicle.

The present disclosure can be applied in heavy-duty vehicles, such as trucks, buses and construction equipment. Although the invention will be described with respect to an articulated hauler, the invention is not restricted to this particular vehicle, but may also be used in other vehicles, for instance other types of work machines such as a wheel loader, a dumper truck, or any other type of construction equipment.

A vehicle, for instance a work machine, may comprise a bogie beam from which two or more wheels are suspended. Generally, such a bogie beam is pivotally connected to a vehicle portion, such as a vehicle frame.

U.S. Pat. No. 4,324,417 discloses a bogie beam system that comprises a variable spring means connecting a portion of the bogie beam to a vehicle frame in order to mitigate the pivot motion of the bogie beam relative to the vehicle frame.

Although the U.S. Pat. No. 4,324,417 system may be appropriate for many applications, there is still a need for improving bogie beam systems.

It is desirable to provide a reliable suspension arrangement for a bogie beam for a vehicle.

As such, an aspect of the present disclosure relates to a suspension arrangement for a bogie beam for a vehicle. The suspension arrangement comprises a connector having a means for pivotally connecting the connector to a vehicle main body for pivoting around a substantially horizontal bogie pivot axis.

According to an aspect of the present disclosure, the suspension arrangement further comprises a resilient means for connecting the connector and the bogie beam to each other.

By virtue of the fact that the resilient means is adapted to connect the connector to the bogie beam, the magnitude of displacements of the bogie beam relative to the vehicle main body, such as a vehicle frame of the vehicle main body, may be reduced in a straightforward manner.

This in turn implies that the vehicle hosting the suspension arrangement may be driven at a higher speed on an uneven ground, as compared to a vehicle not equipped with the suspension arrangement, even when the vehicle is driven in an unloaded condition (or a condition with low load) in which the suspension from the wheels connected to the bogie beam may be low.

For instance, the intended position of the resilient means, viz between the connector and the bogie beam, implies a space efficient suspension of the bogie beam.

Further, by virtue of the fact that the connector has a means for pivotally connecting the connector to a vehicle main body, the resilient means may be designed with a focus on providing an appropriate suspension in at least the vertical direction. This in turn implies an appropriate versatility in the design of the resilient means.

As a non-limiting example, the pivotally connecting means may be such that the connector can pivot within at least a predetermined pivot range around the substantially horizontal bogie pivot axis. Purely by way of example, the size of the predetermined pivot range may be at least 10°. For instance, the predetermined pivot range may be a deviation of at least ±5° from an initial angular position of the connector.

Moreover, and again as a non-limiting example, the resilient means may be such that a relative motion of at least 10 millimeters, alternatively at least 30 millimeters, optionally more than 40 millimeters, between the connector and the bogie beam can be obtained. For instance, the relative motion may be a substantially vertical relative motion.

Optionally, the suspension arrangement comprises a bearing, such as a slide bearing or a roller bearing, at least a portion of which forming part of the means for pivotally connecting the connector to the vehicle main body. The bearing implies a cost efficient way of pivotally connecting the connector to the vehicle main body.

Optionally, the resilient means comprises a first resilient member. Optionally, the first resilient member comprises a rubber spring, preferably a rubber shear spring. By virtue of a rubber spring, a reliable and durable resilient means may be obtained.

Optionally, the resilient means comprises a second resilient member. Optionally, the second resilient member comprises a rubber spring, preferably a rubber shear spring.

Optionally, the connector has a connector extension in a connector direction. The connector direction extends from a connector top portion to a connector bottom portion.

Optionally, the vehicle extends in a vertical direction that is positive in a direction from the ground up towards the vehicle and the connector direction substantially extends in a negative vertical direction when the connector is connected to the vehicle main body.

Optionally, the first resilient member is adapted to extend from the connector to the bogie beam in a direction having a component extending in the connector direction.

Optionally, the second resilient member is adapted to extend from the connector to the bogie beam in a direction having a component extending in the connector direction.

An extension in the connector direction for the first and/or the second resilient member implies that the suspension by the resilient member may be achieved at least partially by a compression of the resilient member. Many types of resilient members, such as e.g. rubber elements, generally have better suspension characteristics when operating in a compressed state than when operating under tensile strain.

Optionally, the first resilient member is adapted to extend from the connector to the bogie beam in a first direction having a component extending in a first horizontal direction, perpendicular to the connector direction, and the second resilient member extends from the connector to the bogie beam in a second direction having a component extending in a second horizontal direction. The second horizontal direction is substantially opposite to the first horizontal direction.

The above horizontal directions imply that the first and second resilient members substantially keep the horizontal position of the connector in relation to the bogie beam.

A second aspect of the present disclosure relates to a bogie beam assembly comprising a bogie beam and a suspension arrangement according to the first aspect of the present disclosure. The resilient means connects the connector to the bogie beam.

Optionally, the bogie beam comprises a bogie beam abutment portion. The connector has a connector abutment portion which is adapted to abut a portion of the bogie beam abutment portion when the resilient means has been deformed to a predetermined extent.

By virtue of the fact that a connector abutment portion is adapted to abut the bogie beam abutment portion, the bogie beam may be pivoted relative to a portion of a vehicle, such as a vehicle frame, even if the resilient means has been deformed to a large extent and/or even if the resilient means has ceased to function properly, e.g. due to a resilient means failure. This in turn implies that the basic functionality of the bogie beam, viz the ability to pivot relative to a vehicle portion, may not be dependent on the function of the resilient means.

Optionally, the bogie beam assembly comprises an initial gap between the connector abutment portion and the bogie beam abutment portion. Preferably, the initial gap may be at least 10 millimetres, more preferred at least 30 millimetres, alternatively at least 40 millimetres. The initial gap may be obtained when the vehicle is in an unloaded condition. Moreover, the bogie beam assembly may be such that the connector abutment portion abuts the portion of the bogie beam recess wall when the vehicle is in a loaded condition. In a loaded condition, sufficient suspension may be obtained from the wheels connected to the bogie beam assembly.

Optionally, the connector abutment portion and the portion of the bogie beam recess wall are such that when the connector abutment portion abuts the portion of the bogie beam recess wall, the bogie beam may be pivoted relative to a portion of a vehicle in both a positive and a negative direction.

As a non-limiting example, the connector abutment portion and the portion of the bogie beam recess wall may be such that when the connector abutment portion abuts the portion of the bogie beam recess wall, at least two abutment points are obtained which are located at a distance from one another. Purely by way of example, the connector abutment portion and the portion of the bogie beam recess wall may have corresponding shapes.

Optionally, the bogie beam comprises a bogie beam cavity delimited by a bogie beam cavity wall, preferably said bogie beam cavity wall comprising the bogie beam abutment portion.

A third aspect of the present disclosure relates to a vehicle, preferably an articulated hauler, comprising a suspension arrangement according to the first aspect of the present disclosure and/or a bogie beam assembly according to the second aspect of the present disclosure.

BRIEF DESCRIPTION OF THE DRAWINGS

With reference to the appended drawings, below follows a more detailed description of embodiments of the invention cited as examples.

In the drawings.

It should be noted that the appended drawings are not necessarily drawn to scale and that the dimensions of some features of the present invention may have been exaggerated for the sake of clarity.

DETAILED DESCRIPTION

The invention will be described in the following for a vehicle in the form of an articulated hauler 10 such as the one illustrated in FIG. 1. The articulated hauler 10 should be seen as an example of a vehicle which could comprise a suspension arrangement and/or a bogie beam assembly according to the present invention.

The vehicle 10 comprises a vehicle main body 12 having a vertical extension in a vertical direction V. Moreover, and as is indicated in FIG. 1, the vehicle main body 12 also has an extension in a longitudinal dimension L in the intended drive direction of the vehicle 10 and an extension in a transversal dimension T being perpendicular to each one of the vertical and longitudinal dimensions V, L.

Figure 1:
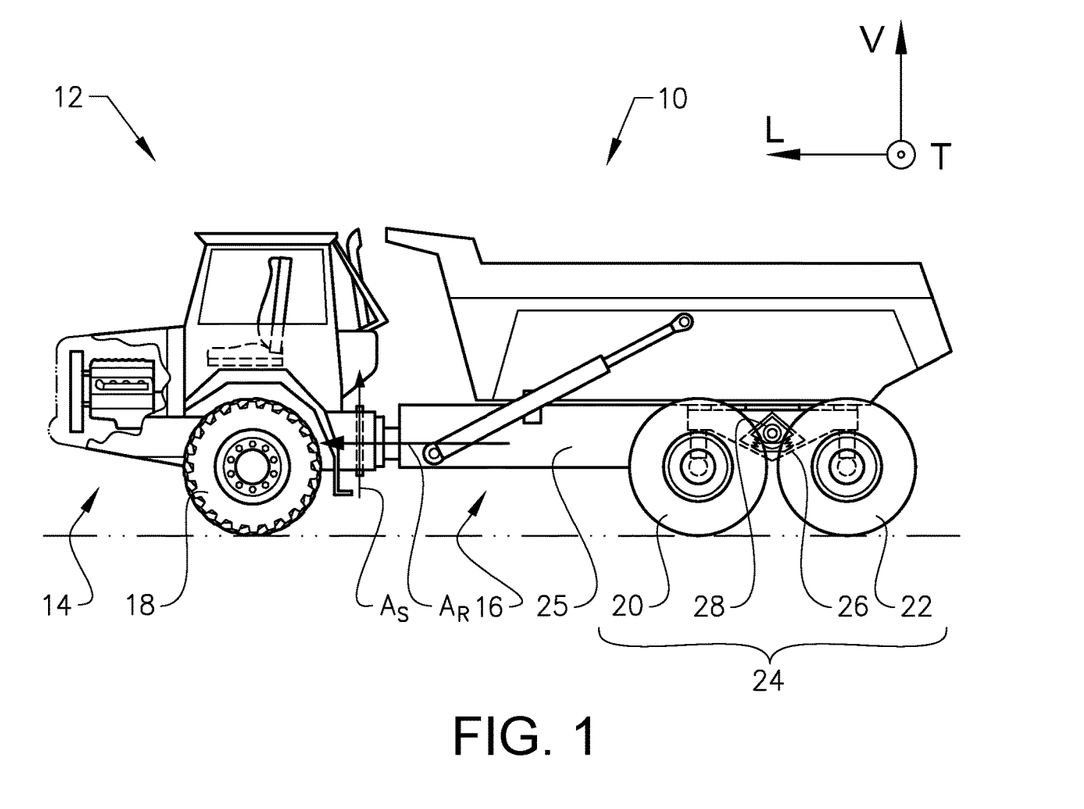
FIG. 1 is a schematic side view of a vehicle.

The FIG. 1 vehicle 10 comprises a front vehicle portion 14 and a rear vehicle portion 16. The front and rear vehicle portions 14, 16 are connected to one another such that the front and rear vehicle portions can pivot relative to one another around a steering axis $A_S$ extending substantially in the vertical dimension V and/or around a geometrical axis of rotation $A_R$ extending substantially along the longitudinal dimension L. Each one of the vehicle portions 14, 16 forms part of the vehicle main body 12.

Moreover, the vehicle 10 comprises a plurality of wheels 18, 20, 22 each one of which is connected, directly or indirectly, to the vehicle main body 12. Moreover, the FIG. 1 vehicle 10 may comprises a bogie beam assembly 24. In the FIG. 1 embodiment of the vehicle 10, the bogie beam assembly 24 is connected to the rear vehicle portion 16 but in other embodiments, the front vehicle portion 14 may instead, or also, comprise a bogie system (not shown).

As used herein, the expression "vehicle main body 12" comprises all portions of the vehicle 10 except for the bogie beam assembly 24. The bogie beam assembly 24 is generally attached to a frame 25 of the vehicle 10, which frame 25 thus forms part of the vehicle main body 12, but it is also envisaged that the bogie beam assembly 24 may be connected to another portion of the vehicle main body 12.

As may be gleaned from FIG. 1, the bogie beam assembly 24 comprises a plurality of wheels 20, 22 and the bogie beam assembly 24 is such that each one of the wheels 20, 22 is allowed to be subjected to a relative vertical displacement in relation to the vehicle body 12. To this end, the bogie beam assembly 24 comprises a bogie beam 26 connecting the wheels 20, 22. The bogie beam 26 is pivotable around a bogie pivot axis 28 in relation to the vehicle main body 12 to thereby allow each one of the wheels 20, 22 to be subjected to a displacement in at least the vertical direction V, in relation to the vehicle main body 12.

Figure 2:
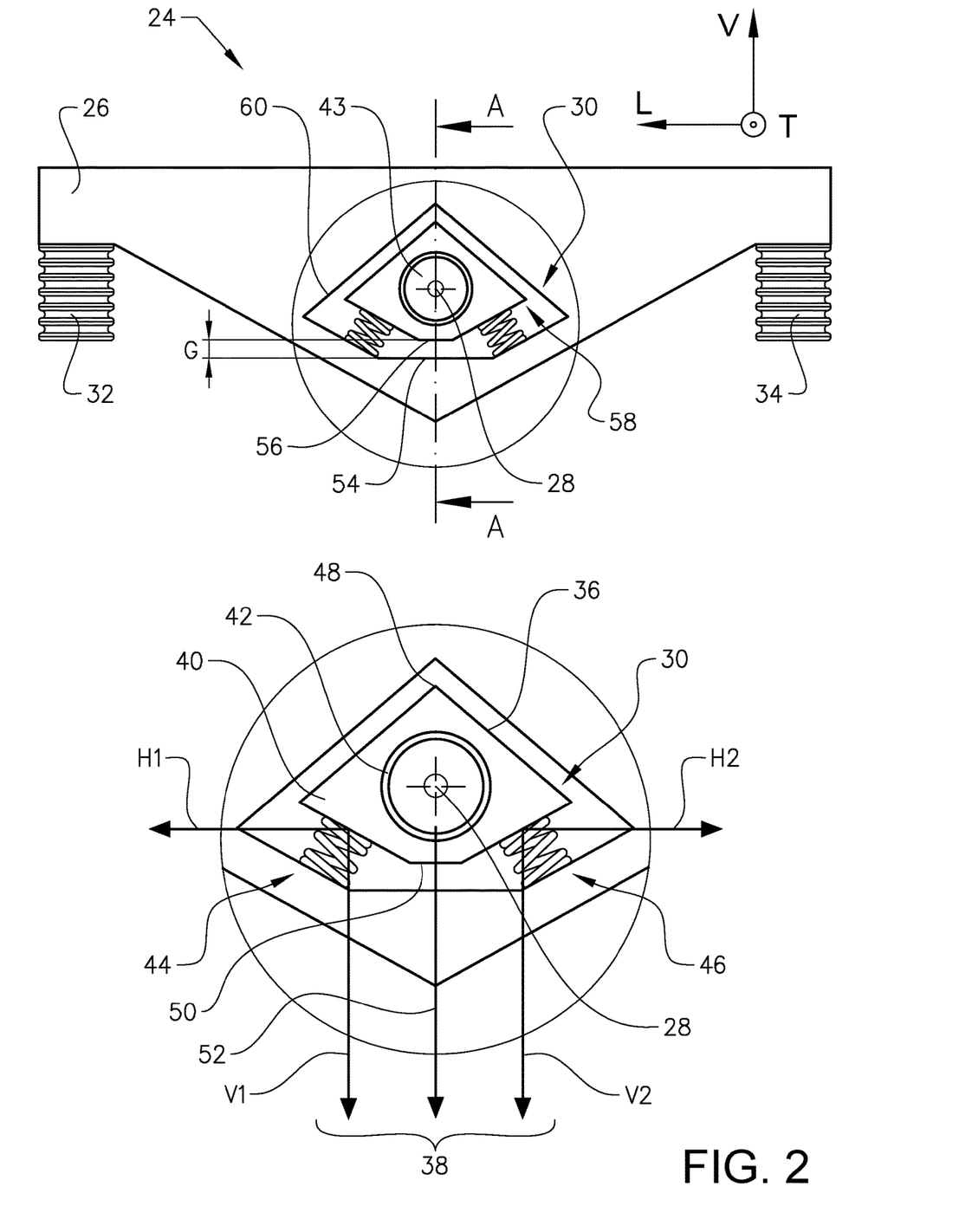
FIG. 2 is a schematic side view of an embodiment of a bogie beam assembly.

FIG. 2 illustrates an embodiment of the bogie beam assembly 24. The FIG. 2 bogie beam assembly 24 comprises a bogie beam 26 and a suspension arrangement 30. Moreover, the FIG. 2 bogie beam assembly 24 comprises a forward wheel joint 32 and a rearward wheel joint 34. Each one of the wheel joints 32, 34 is adapted to be connected to a wheel (not shown in FIG. 2). The wheel joints 32, 34 are located on the bogie beam 26 on opposite sides of the suspension arrangement 30. As is indicated in FIG. 2, each one of the wheel joints 32, 34 may comprise suspension means.

It is also envisaged that embodiments of the bogie beam assembly 24 may comprise a bogie beam 26 comprising more than two wheel joints (not shown) and/or a wheel joint that may be adapted to be connected to more than one wheel (not shown).

As may be gleaned from FIG. 2, the suspension arrangement 30 comprises a connector 36 having a means for pivotally connecting the connector to the vehicle main body (not shown in FIG. 2) for pivoting around a substantially horizontal bogie pivot axis 28.

Purely by way of example, and as is indicated in the FIG. 2 embodiment, the suspension arrangement 30 may comprise a connector body 40 and a bearing 42, such as a slide bearing or a roller bearing. As a non-limited example, the bearing 42 may be adapted to receive a shaft 43 of a vehicle such that the connector body 40 is pivotable around the vehicle shaft 43. In the above implementation, the connector 36 thus comprises the connector body 40 and the portion of the bearing 42 that is adapted to move with the connector body 40.

As another non-limiting example, the suspension arrangement 30 may comprise a first connector body (not shown) and a second connector body (not shown) that are connected to one another via the bearing 42. In such an implementation, one of the first and second connector bodies may be adapted to be fixedly attached to the vehicle main body.

It is also envisaged that the implementations of the connector 36 need not necessarily be furnished with a bearing in order to be pivotally connectable to the vehicle main body, e.g. a vehicle frame of the vehicle main body. Purely by way of example, such an implementation may comprise a protrusion (not shown) such as a shaft (not shown) that is adapted to be received by a pivotable attachment arrangement (not shown), e.g. an arrangement comprising a bearing, of the vehicle main body.

The suspension arrangement 30 further comprises a resilient means 38 for connecting the connector 30 and the bogie beam 26 to each other. Purely by way of example, the resilient means 38 may be fixedly connected to the connector 30, for instance by means of a joint, such as a weld joint or a bolt joint, or by means of an adhesive, such as glue. Moreover, and again purely by way of example, the resilient means 38 may be adapted to be connected to the bogie beam 26 by means of a joint, such as a weld joint or a bolt joint, and/or by means of an adhesive, such as glue.

In the embodiment illustrated in FIG. 2, the resilient means comprises a first resilient member 44. Purely by way of example, the first resilient member 44 may comprise a spring, such as a helical spring. FIG. 2 further illustrates that the resilient means 38 comprises a second resilient member 46. As for the first resilient member, and again as a non-limiting example, the second resilient member 46 may comprise a spring, such as a helical spring.

Figure 4:
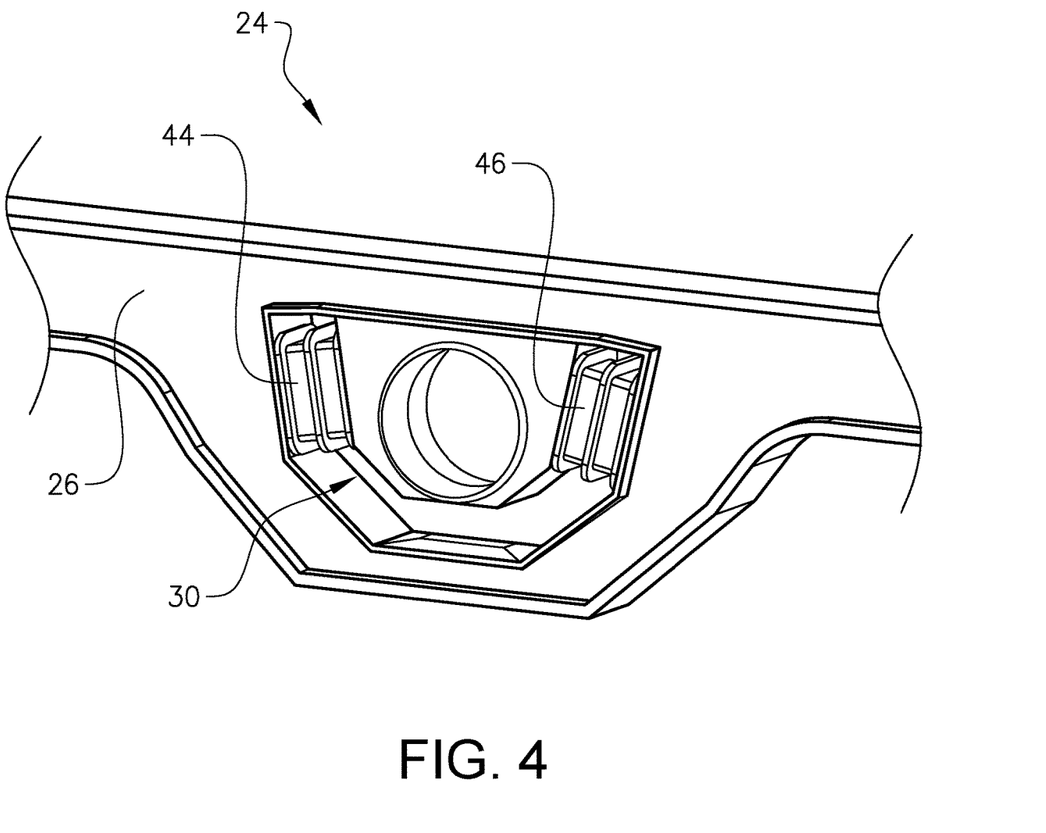
FIG. 4 is a schematic perspective view of another embodiment of a bogie beam assembly.

In other embodiments, and as is illustrated in FIG. 4, each one of the first and second resilient members 44, 46 may comprise a rubber spring, preferably a rubber shear spring.

It is also envisaged that embodiments of the suspension arrangement 30 may comprise a single resilient member, e.g. a rubber spring, substituting both the resilient members in FIG. 2.

FIG. 2 further illustrates that the connector 36 has a connector extension in a connector direction 52. The connector direction 52 extends from a connector top portion 48 to a connector bottom portion 50. When the connector is connected to a vehicle (not shown) and the vehicle is positioned on a flat ground, the connector top portion 48 is the uppermost portion and the connector bottom portion 50 is the lowermost portion of the connector 36.

As indicated in FIG. 2, the vehicle a portion of which the connector 36 is adapted to be connected to may extend in a vertical direction V that is positive in a direction from the ground up towards the vehicle. Moreover, FIG. 2 illustrates that the connector direction 52 may substantially extend in a negative vertical direction when the connector 36 is connected to the vehicle main body.

As a non-limiting example, the first resilient member 44 may be adapted to extend from the connector 36 to the bogie beam 26 in a direction having a component V1 extending in the connector direction 52. In a similar vein, the second resilient member 46 may adapted to extend from the connector 36 to the bogie beam 26 in a direction having a component V2 extending in the connector direction 52. The above directions V1, V2 imply that the first resilient member 44 and/or the second resilient member 46 may be compressed, rather than being strained, during use.

FIG. 2 further illustrates that the first resilient member 44 may be adapted to extend from the connector 36 to the bogie beam 26 in a first direction having a component H1 extending in a first horizontal direction, perpendicular to the connector direction 52, and the second resilient member 46 may be adapted to extend from the connector 36 to the bogie beam 26 in a second direction having a component H2 extending in a second horizontal direction. The second horizontal direction is substantially opposite to the first horizontal direction.

Moreover, FIG. 2 illustrates that the bogie beam comprises a bogie beam abutment portion 54. The connector 36 has a connector abutment portion 56 which is adapted to abut the bogie beam abutment portion 54 when the resilient means 38 has been deformed to a predetermined extent.

Figure 5:
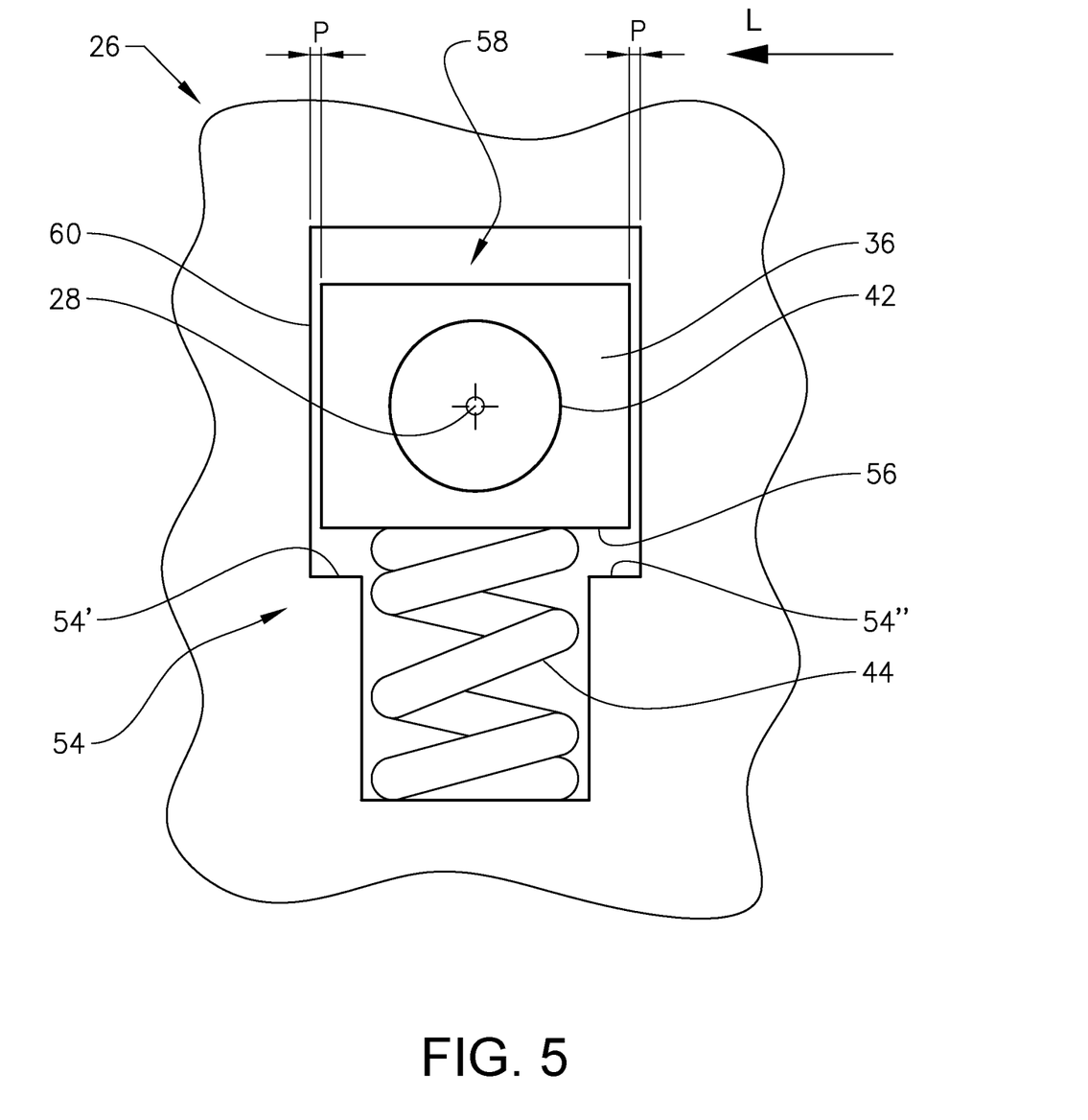
FIG. 5 is a schematic perspective view of a further embodiment of a bogie beam assembly.

As a non-limiting example, in order to increase the probability that the bogie beam assembly 24 may function at least as a traditional bogie beam without any resilient means in the case that the resilient means 38 is excessively deformed and/or the resilient means 38 does not function properly, the connector abutment portion 56 and the bogie beam abutment portion 54 are such that when the connector abutment portion 56 abuts the bogie beam abutment portion 54, at least two abutment points are obtained which are located at a distance from one another, e.g. on either side of the horizontal bogie pivot axis 28, see e.g. FIG. 5.

FIG. 2 illustrates a non-limiting implementation in which an abutment area is formed between the connector abutment portion 56 and the bogie beam abutment portion 54 when they are contacting one another. Such an abutment area comprises a plurality of abutment points which in turn implies an appropriate motion transfer between the connector 36 and the bogie beam 26.

Moreover, FIG. 2 illustrates that the bogie beam assembly 24 may comprise an initial gap G between the connector abutment portion 56 and the bogie beam abutment portion 54. The initial gap preferably being at least 10 millimetres, more preferred at least 30 millimetres, alternatively at least 40 millimetres. The initial gap G may be obtained in an unloaded condition of the vehicle. In a loaded condition of the vehicle, the resilient means 38 may be deformed to such an extent that the connector abutment portion 56 abuts the bogie beam abutment portion 54. As a non-limiting example, and as is indicated in FIG. 2, the gap G may be measured in the connector direction 52 which in turn may coincide with the negative vertical direction.

Moreover, as is indicated in FIG. 2, the bogie beam 26 may comprise a bogie beam cavity 58 delimited by a bogie beam cavity wall 60. As is indicated in FIG. 2, the bogie beam cavity wall 60 may comprise the bogie beam abutment portion 54. As is indicated in FIG. 2, bogie beam cavity 58 may be a through opening in the bogie beam 26. However, it is also envisaged that implementations of the bogie beam 26 may instead comprise an open recess (not shown) at least partially delimited by a recess wall comprising the bogie beam abutment portion 54.

Figure 3:
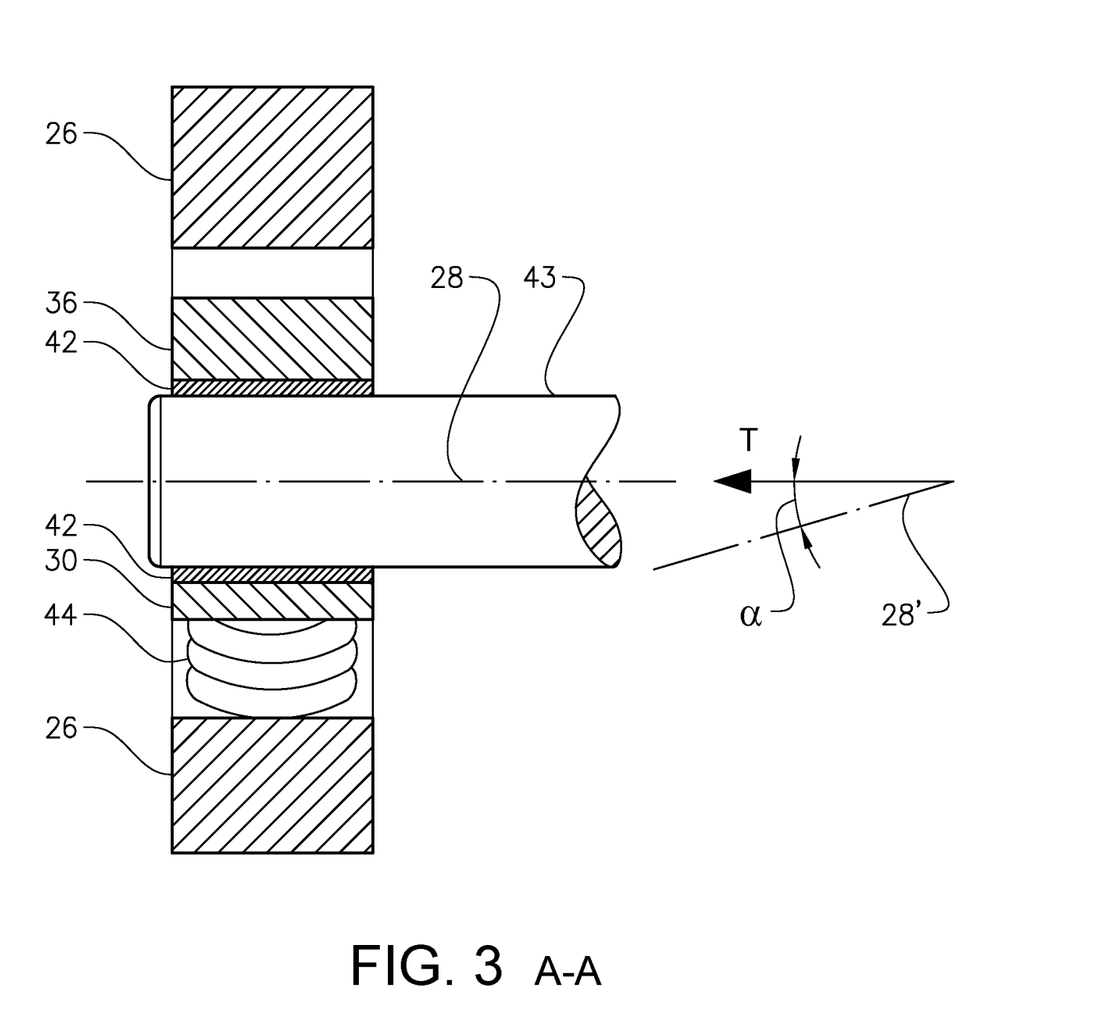
FIG. 3 is a cross-sectional view of the FIG. 2 embodiment.

FIG. 3 illustrates a cross-section of the FIG. 2 embodiment. FIG. 3 illustrates that the shaft 43 is connected to the bearing 42 such that the connector 36 is adapted to pivot around a bogie pivot axis 28. The bogie pivot axis 28 illustrated in FIG. 3 is substantially horizontal. In fact, the bogie pivot axis 28 illustrated in FIG. 3 is substantially parallel to a line extending in the transversal dimension T. However, it is also envisaged that embodiments of the suspension arrangement 30 may comprise a connector 36 that is adapted to pivot around a bogie pivot axis 28 that forms an angle with a line extending in the transversal dimension T. Purely by way of example, the bogie pivot axis 28 may extend in a direction that forms an angle of less than 30°, preferably less than 150, with a line extending in the transversal dimension T. Instead of, or in addition, to the above, the bogie pivot axis 28 may extend in a direction that extends in a plane that is parallel to the plane formed by the vertical and transversal dimensions V, T.

Purely by way of example, it is envisaged that such a bogie pivot axis 28 may comprise a component that extends in a negative vertical direction such that a bogie pivot axis 28' forms an angle α with a line extending in the transversal dimension T. Such an inclined bogie pivot axis 28' is illustrated in the right portion of FIG. 3. A bogie pivot axis 28' extending in a direction with a component in the negative vertical direction implies that a wheel (not shown) connected to the bogie beam 26 will move outward from the vehicle when the wheel moves upwards, i.e. in a positive vertical direction. This in turn implies that a relatively large vertical displacement of a wheel may be obtained without interfering with other vehicle parts.

FIG. 4 illustrates another embodiment of a bogie beam assembly 24. As compared to the FIG. 2 embodiment, the first and second resilient members 44, 46 of the FIG. 4 embodiment extend in a more horizontal direction. In the FIG. 2 embodiment, each one of the first and second resilient members 44, 46 forms an angle of approximately 45° with a plane formed by the longitudinal and transversal dimensions L, T whereas the corresponding angle is approximately 15° for each one of the first and second resilient members 44, 46 in the FIG. 4 embodiment. As such, in the FIG. 4 embodiment, the suspension of the resilient means is at least partly obtained by shearing of the first and second resilient members 44, 46. Moreover, the FIG. 4 embodiment is illustrated in a condition with a relatively low load, e.g. an unloaded condition, i.e. the vehicle to which the FIG. 4 bogie beam assembly 24 is connected is in a condition with a relatively low load. As such, if the vehicle is loaded further, the connector may move downwards relative to the bogie beam. For a high vehicle load for instance, an abutment portion of the connector may abut a bogie beam abutment portion.

FIG. 5 illustrates a further embodiment of a bogie beam assembly 24. As compared to the FIG. 2-FIG. 4 embodiments, the resilient means 38 of the FIG. 5 embodiment only comprises a one resilient member 44 which resilient member in FIG. 5 is exemplified by a spring such as a helical spring. However, it is also envisaged that the FIG. 5 resilient means instead, or in addition, may comprise another type of resilient member such as a rubber element (not shown). The FIG. 5 connector 36 is located in a beam cavity 58 delimited by a bogie beam cavity wall 60.

In order to ensure small relative motions at least along the longitudinal dimension L between the connector 36 and the bogie beam 26, a relatively small play P along the longitudinal dimension L may be provided between the connector 36 and the bogie beam 26, viz by the connector 36 and the bogie beam cavity wall 60. As a non-limiting example, the play P may be less than one millimetre on either side of the connector 36. It is also envisaged that the play P may be substantially zero and that portions of the connector 36 and portions of the bogie beam cavity wall 60 form slide surfaces allowing the connector 36 to move in at least the vertical direction relative to the bogie beam 26.

Further, in the FIG. 5 embodiment, the connector comprises a connector abutment portion 56 and the bogie beam 26 comprises a bogie beam abutment portion 54 which in turn comprises two sub-portions 54', 54". The sub-portions 54', 54" are located on either side of the resilient member 44 in the longitudinal dimension L. As such, when the connector abutment portion 56 abuts the sub-portions 54', 54", at least two abutment points, or alternatively at least two abutment areas, are obtained which are located at a distance from one another, e.g. on either side of the horizontal bogie pivot axis 28, see e.g. FIG. 5.

It is to be understood that the present invention is not limited to the embodiments described above and illustrated in the drawings; rather, the skilled person will recognize that many changes and modifications may be made.

The invention claimed is:

1. A suspension arrangement for a bogie beam for a vehicle, comprising a connector having a means for pivotally connecting the connector to a vehicle main body for pivoting around a substantially horizontal bogie pivot axis, wherein the suspension arrangement further comprises a resilient means for connecting the connector and the bogie beam to each other.

2. The suspension arrangement according to claim 1, comprising a bearing, at least a portion of which forming part of the means for pivotally connecting the connector to the vehicle main body, wherein the bearing is adapted to receive a shaft of the vehicle such that a connector body of the connector is pivotable around the vehicle shaft.

3. The suspension arrangement according to claim 2, wherein the bearing comprises one of a slide bearing or a roller bearing.

4. The suspension arrangement according to claim 1, wherein the resilient means comprises a first resilient member.

5. The suspension arrangement according to claim 4, wherein the first resilient member comprises a rubber spring.

6. The suspension arrangement according to claim 5, wherein the rubber spring comprises a rubber shear spring.

7. The suspension arrangement according to claim 4, wherein the resilient means comprises a second resilient member.

8. The suspension arrangement according to claim 7, wherein the second resilient member comprises a rubber spring.

9. The suspension arrangement according to on claim 7, wherein the connector has a connector extension in a connector direction, the connector direction extending from a connector top portion to a connector bottom portion, wherein the second resilient member is adapted to extend from the connector to the bogie beam in a direction having a component extending in the connector direction.

10. The suspension arrangement according to claim 7, wherein the connector has a connector extension in a connector direction, the connector direction extending from a connector top portion to a connector bottom portion, wherein the first resilient member is adapted to extend from the connector to the bogie beam in a first direction having a component extending in a first horizontal direction, perpendicular to the connector direction, and the second resilient member extends from the connector to the bogie beam in a second direction having a component extending in a second horizontal direction, the second horizontal direction being substantially opposite to the first horizontal direction.

11. The suspension arrangement according to claim 4, wherein the connector has a connector extension in a connector direction, the connector direction extending from a connector top portion to a connector bottom portion.

12. The suspension arrangement according to claim 11, wherein the vehicle extends in a vertical direction that is positive in a direction from the ground up towards the vehicle, the connector direction substantially extending in a negative vertical direction when the connector is connected to the vehicle main body.

13. The suspension arrangement according to claim 11, wherein the first resilient member is adapted to extend from the connector to the bogie beam in a direction having a component extending in the connector direction.

14. A bogie beam assembly comprising a bogie beam and a suspension arrangement according to claim 1, the resilient means connecting the connector to the bogie beam.

15. The bogie beam assembly according to claim 14, wherein the bogie beam comprises a bogie beam abutment portion, wherein the connector has a connector abutment portion which is adapted to abut a portion of the bogie beam abutment portion when the resilient means has been deformed to a predetermined extent.

16. The bogie beam assembly according to claim 15, wherein the bogie beam assembly comprises an initial gap between the connector abutment portion and the bogie beam abutment portion.

17. The bogie beam assembly according to claim 15, wherein the bogie beam comprises a bogie beam cavity delimited by a bogie beam cavity wall.

18. The bogie beam assembly according to claim 17, wherein the bogie beam cavity wall comprises the bogie beam abutment portion.

19. A vehicle comprising a suspension arrangement according to claim 1.

20. The vehicle of claim 19, wherein the vehicle further comprises an articulated hauler.

* * * * *